United States Patent [19]
Durrani

[11] Patent Number: 5,767,466
[45] Date of Patent: Jun. 16, 1998

[54] FLEXIBLE SWITCH FOR A VEHICLE STEERING WHEEL ASSEMBLY

[75] Inventor: Sheryar Durrani, Canton, Mich.

[73] Assignee: UT Automotive Dearborn, Inc., Dearborn, Mich.

[21] Appl. No.: 686,108

[22] Filed: Jul. 24, 1996

[51] Int. Cl.⁶ .................. H01H 9/00; B60R 21/00
[52] U.S. Cl. .................. 200/61.54; 200/61.56; 280/731
[58] Field of Search .................. 200/61.54–61.57; 280/728.3, 731

[56] References Cited

U.S. PATENT DOCUMENTS

| | | | |
|---|---|---|---|
| Re. 35,031 | 9/1995 | Winget | 280/731 |
| 4,066,851 | 1/1978 | White et al. | 200/5 A |
| 4,742,192 | 5/1988 | Levine et al. | 200/61.57 |
| 4,934,735 | 6/1990 | Embach | 280/731 |
| 5,146,103 | 9/1992 | Utsumi et al. | 307/10.1 |
| 5,198,629 | 3/1993 | Hayashi et al. | 200/61.54 |
| 5,308,106 | 5/1994 | Heidorn | 200/61.54 X |
| 5,319,243 | 6/1994 | Leicht et al. | 257/692 |
| 5,331,125 | 7/1994 | Weinstein | 200/61.54 |
| 5,335,743 | 8/1994 | Gillbrand et al. | 200/61.54 X |
| 5,465,998 | 11/1995 | Davis | 280/731 |
| 5,542,694 | 8/1996 | Davis | 200/61.54 X |
| 5,569,893 | 10/1996 | Seymour | 200/61.54 |
| 5,585,606 | 12/1996 | Ricks | 200/61.08 |

FOREIGN PATENT DOCUMENTS

| | | |
|---|---|---|
| 0613157 | 8/1994 | European Pat. Off. . |
| 0669229 | 8/1995 | European Pat. Off. . |
| 9210027 | 1/1994 | Germany . |

*Primary Examiner*—J. R. Scott
*Attorney, Agent, or Firm*—Howard & Howard

[57] ABSTRACT

A switch for a vehicle steering wheel assembly is formed from a first and second layer of flexible material. Circuit traces are disposed on an opposed face of the first layer to control a horn function and at least a cruise control function. The second layer overlays the first layer and has a plurality of electrically conductive members spaced from the circuit traces. The second layer may be moved toward the first layer, such that at least one of the electrically conductive members is driven into contact with a circuit trace to close a switch.

11 Claims, 3 Drawing Sheets

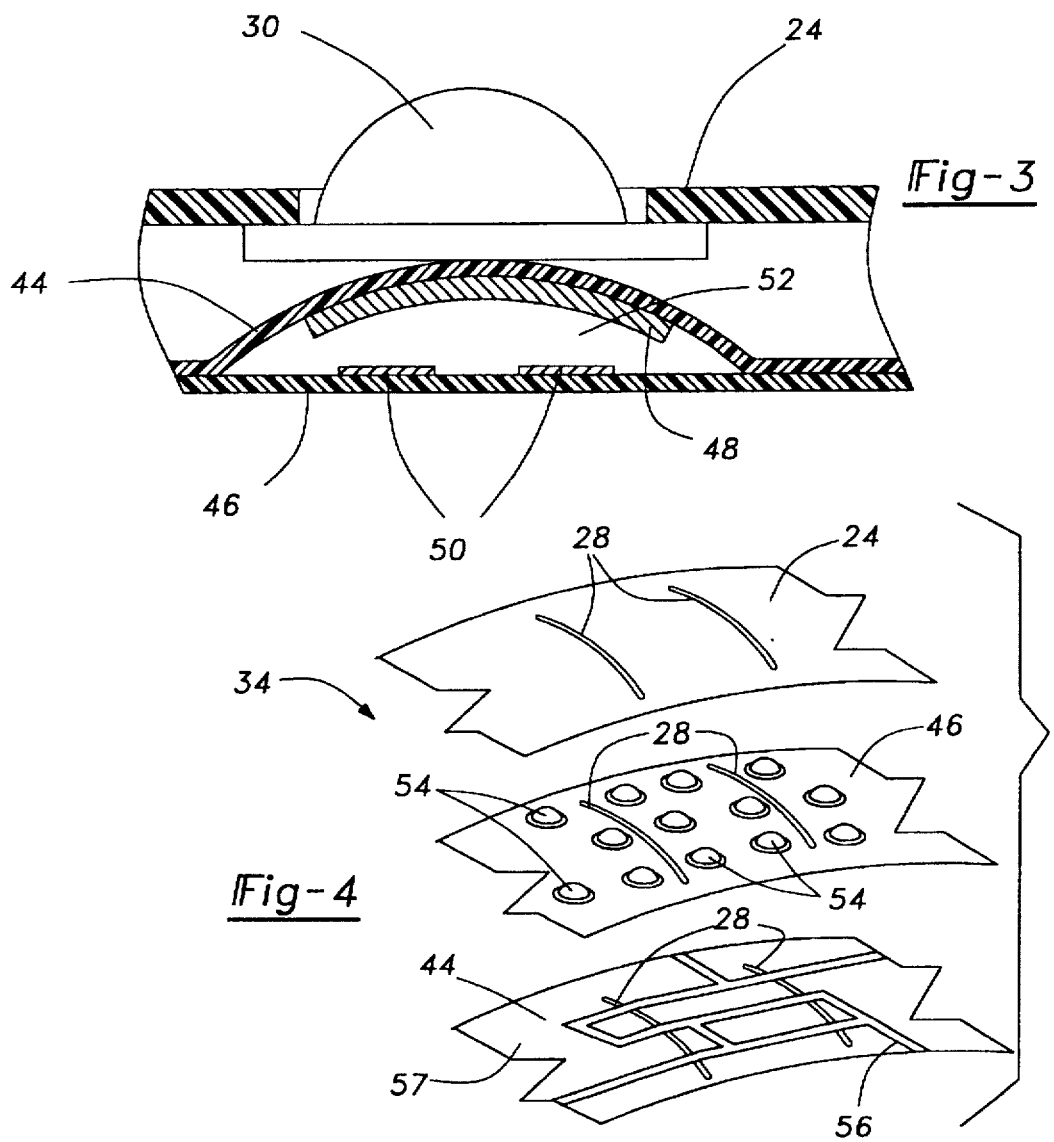
Fig-3
Fig-4
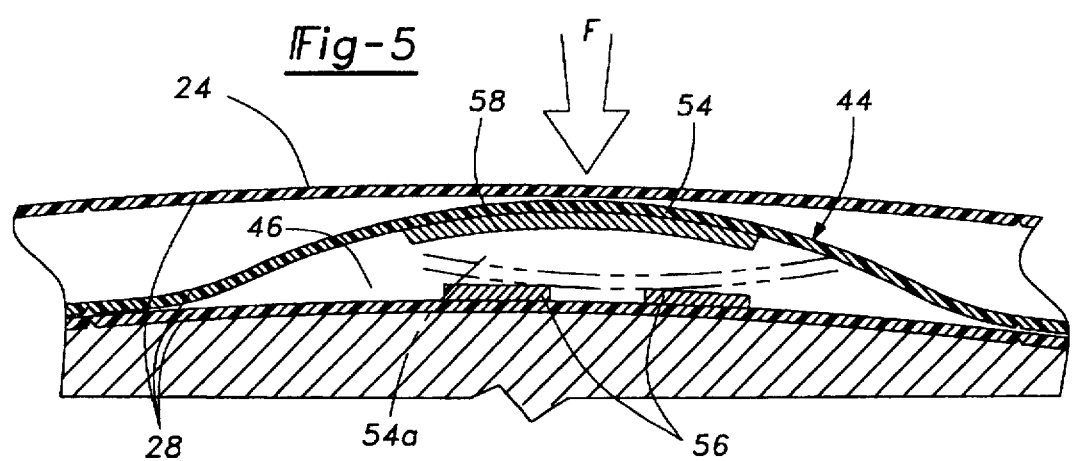
Fig-5

FLEXIBLE SWITCH FOR A VEHICLE STEERING WHEEL ASSEMBLY

BACKGROUND OF THE INVENTION

The present invention relates generally to a switch that comprises a flexible material disposed just below the flexible outer cover of the steering wheel. An operator can actuate a horn switch by pushing down on the outer cover, thereby triggering the horn function and can also actuate other functions, such as cruise control through the flexible switch.

Modern vehicles have several electrical switches disposed in the steering wheel assembly. The switches generally comprise rigid mechanical articles having contact points spaced from each other. The switches are connected to wires through rigid connectors. Typically, there are at least horn switches and cruise control switches in the steering wheel. Also, more switch functions are being disposed in the wheel.

In the known art, a horn function is typically actuated by depressing one contact point and driving it toward the other contact point. This type of horn switch assembly includes a combination of several connectors and can be very costly. If any of the connectors fail, the entire horn switch function may not work. Further, the operator must accurately depress the horn switch contact point to actuate the horn function. Thus, if the operator happens to depress a portion of the steering wheel assembly remote from the horn switch contact point, the horn function will not operate.

Steering wheel assemblies also contain an airbag and possess the complication of having to arrange the horn switch and other switches to accommodate the airbag. Because the airbag triggers by expanding outwardly through the outer cover of a steering wheel assembly, the horn switch must be designed so as not to interfere with the airbag. This makes rigid switches and connectors somewhat undesirable.

The known art has not successfully addressed these problems.

SUMMARY OF THE INVENTION

The present invention provides a flexible switch that provides all switch function for the vehicle steering wheel assembly. The switch comprises two layers of flexible material. One layer has circuit traces disposed on an opposed face which controls several functions. Another layer has a plurality of electrically conductive members spaced from the circuit traces. An operator may trigger the switch by depressing the conductor layer which results in at least one of the conductive members being urged into contact with a circuit trace to actuate a function. Switches are preferably incorporated into the flexible layers for both horn and other functions, such as cruise control.

In a disclosed embodiment, the conductor layer includes a plurality of bubble members each having an inner face upon which a conductive member is disposed. The horn switch may also include a flexible outer cover which overlays the conductor layer. When an operator depresses the outer cover, at least one bubble is moved toward the trace layer, thereby urging a conductive member into contact with a circuit trace to trigger a switch function.

Preferably, there is a horn switch at a central area and switches for other functions such as cruise control at outer locations. The steering wheel outer cover overlays the horn switch such that when an operator depresses the outer cover, at least one of the bubble members are urged toward the trace layer, urging a corresponding conductive member into contact with the traces, thereby triggering the horn switch.

The horn switch may also include a rigid actuation element disposed between the outer cover and the conductor layer with arms each having a finger abutting a corresponding bubble member. Upon applying a force to the outer cover, at least one finger is moved to urge the conductor layer toward the trace layer and a conductive member into contact with a circuit trace to trigger the horn switch.

These and other features of the present invention will be best understood from the following specification and drawings, of which the following is a brief description.

BRIEF DESCRIPTION OF THE DRAWINGS

FIG. 3 is a cross-sectional view along line 3—3 of FIG. 2.

FIG. 4 is an exploded, perspective view of a horn switch according to the present invention.

FIG. 5 is a cross-sectional view of the horn switch of FIG. 4.

DETAILED DESCRIPTION OF A PREFERRED EMBODIMENT OF THE INVENTION

Figure 1:
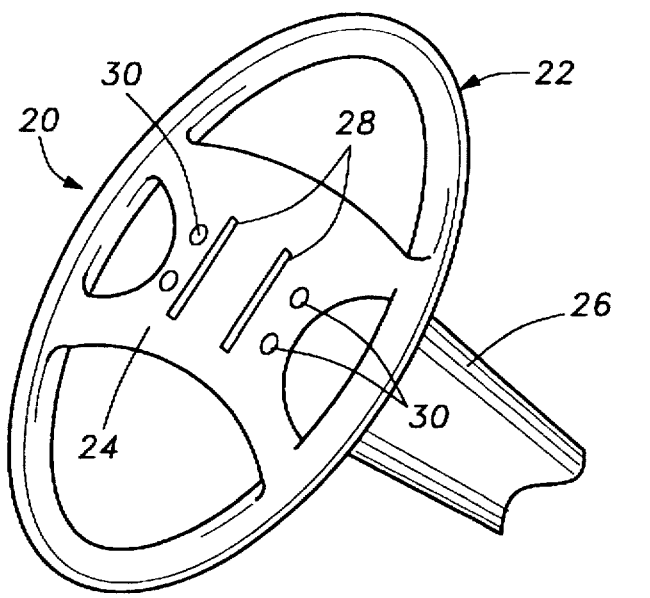
FIG. 1 is a perspective view of a vehicle steering wheel assembly according to the present invention.

A steering wheel assembly of the present invention is generally shown at 20 in FIG. 1 and includes a steering wheel 22 having an outer cover 24. Steering wheel assembly 20 is secured to a steering column shaft 26. As shown, notches 28 form tear strips in the outer cover 24 to allow an airbag to escape when actuated. Buttons 30 are shown on the steering wheel 22, and may control various vehicle functions, such as a cruise control system.

Figure 2:
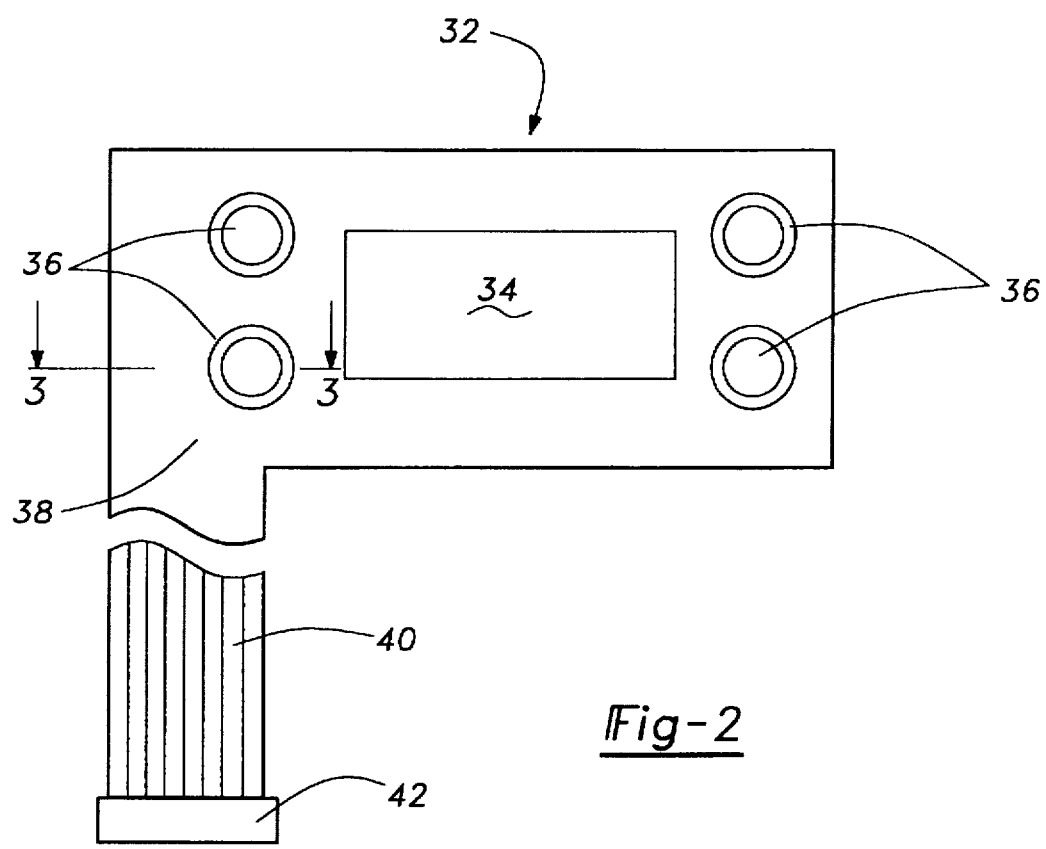
FIG. 2 shows a flexible switch.

FIG. 2 shows a flexible switch 32 to be placed beneath the steering wheel outer cover. A central portion 34 of the flexible switch 32 will control a horn function, and will be disclosed in greater detail below. For simplicity, the central portion 34 is shown as a square in this figure, however, its actual configuration resembles that shown in FIGS. 4–7.

Bubbles 36 are formed extending from a flexible layer 38. The bubbles 36 are placed under the buttons 30 in the outer cover 24. A plurality of wires 40 are shown in a ribbon end 41 of the flexible switch 32. The wires 40 lead to a hard connector 42 which is connected to another electrical connector, such as a clock spring. By having the ribbon end 41 extend away from the flexible switch 32, the hard connector 42 is removed from the steering wheel outer surface. The hard connector 42 is connected to the clock spring at a good distance from the front of the steering wheel. In this way, there are no hard switch members in the forward face of the steering wheel.

As shown in FIG. 3, the cruise control button 30 is positioned over one of the bubbles 36. The bubbles 36 are formed in a conductor flexible layer 44. The conductor flexible layer 44 is placed over a trace flexible layer 46. An electrical conductor 48 is positioned on an inner surface of the bubble 36. The layer 46 includes circuit traces 50. When button 30 is depressed, bubble 36 moves downwardly and conductor 48 moves to the position shown in phantom at 52 where it completes a circuit between the contacts 50.

Preferably, the flexible circuit is of a type known in the prior art wherein the circuit traces 50 are etched on a Mylar™ layer 46. Layer 44 is formed from a flexible material, and is molded to have bubbles 36. The bubbles are formed to be biased to the position illustrated in solid line at FIG. 3. Thus, once button 30 is released, the bubble 36 returns to a position where it is spaced from contacts 50.

As shown in FIG. 4, the horn switch area 34, incorporates a portion of flexible switch 32 also having a conductor layer of flexible material 44, and circuit trace layer of flexible material 46. Outer cover 24 preferably comprises a relatively flexible, resilient material such as a polyurethane. Layer 44 has a plurality of bubbles 54, and is preferably formed from a stable plastic material having good adhesion properties. Most preferably, layer 44 is formed of Mylar™, a polyester film commercially available from DuPont. The number of bubbles in layer 44 should be sufficient in number such that the horn function can be activated from the center of outer cover 24 as set forth below.

Trace layer 46 also comprises a flexible, resilient material. Most preferably, layer 46 is formed of Mylar™. A plurality of circuit traces 56 are etched onto a face 57 of layer 46 in a known manner and preferably comprise copper. The circuit traces include sufficient traces to achieve all of the necessary switch functions for the steering wheel. As an example, in the disclosed embodiment there are separate circuit traces to control cruise control and also horn functions. The use of a Mylar™ layer having etched circuitry is known in the art. An inventive feature of this invention is to utilize such a circuit to control all switching functions in a steering wheel. Moreover, the details of how the horn switch are achieved are also not known in the prior art.

Traces 56 are electrically connected in a conventional manner to control a horn function and other functions through wires 40. Layer 44 and 46 each also preferably include one or more notches 28 which provide tear strips to facilitate an airbag expanding outwardly when triggered through the switch layers and outer cover of the steering wheel assembly 20.

As shown in FIG. 5, layer 44 overlays layer 46 and includes an electrical conductor 58 disposed on an inner face 59 of bubble 54, and spaced from traces 56 in a relaxed position. The bubbles 54 are formed to be biased upwardly away from the trace layer 46. The bubbles 54 return to this relaxed non-contact position when released. The technology for forming such bubbles is known in the art.

Outer cover 24 overlays layer 44 such that at least a portion of outer cover 24 touches layer 44. Horn switch portion 34, is placed over a relatively stiffer component of steering wheel assembly 20 such as an airbag assembly 58 to can provide resistance to a compression force applied to actuate the horn function. Thus, layers 44 and 46 are sandwiched between outer cover 24 and component 58 of steering wheel assembly 20.

Layers 44 and 46 may be formed independently and inserted into steering wheel assembly 20 during manufacture. That is, the outer cover 24, may initially be molded, then layers 44 and 46 forming the flexible switch 32 positioned within cover 24 with layer 44 abutting an inner face of cover 24. Other components of steering wheel assembly 20 such as airbag 58 are then positioned within cover 24. Alternatively, layers 46 and 44 of switch 32 may be formed integrally with outer cover 24. Thus, layers 46 and 44 may be initially formed, followed by molding outer cover 24 over layers 46 and 44 providing an integral switch 32 molded with outer cover 24.

To activate the horn switch portion 34 of the present invention, an operator may apply a force indicated by arrow F, which deforms outer cover 24 and layer 44 inwardly toward layer 46. Bubbles 54 are deformed to a position such that conductor 58 is moved into contact with circuit traces 56 (shown in phantom) in an on position as shown at 58a. Conductor 58 then abuts traces 56 and an electrical circuit is closed, actuating the horn. As long as force F is applied to outer cover 24, conductor 58 remain in contact with traces 56, thereby maintaining the horn switch in an on position. When force F is removed, the outer cover 24 and layer 44 move back to the relaxed position with conductor 58 spaced from circuit traces 56. Since the bubbles cover all of the central area of the wheel, an operator need not push on a particular portion of the wheel. Rather, almost any central location on the wheel may be actuated.

Figure 6:
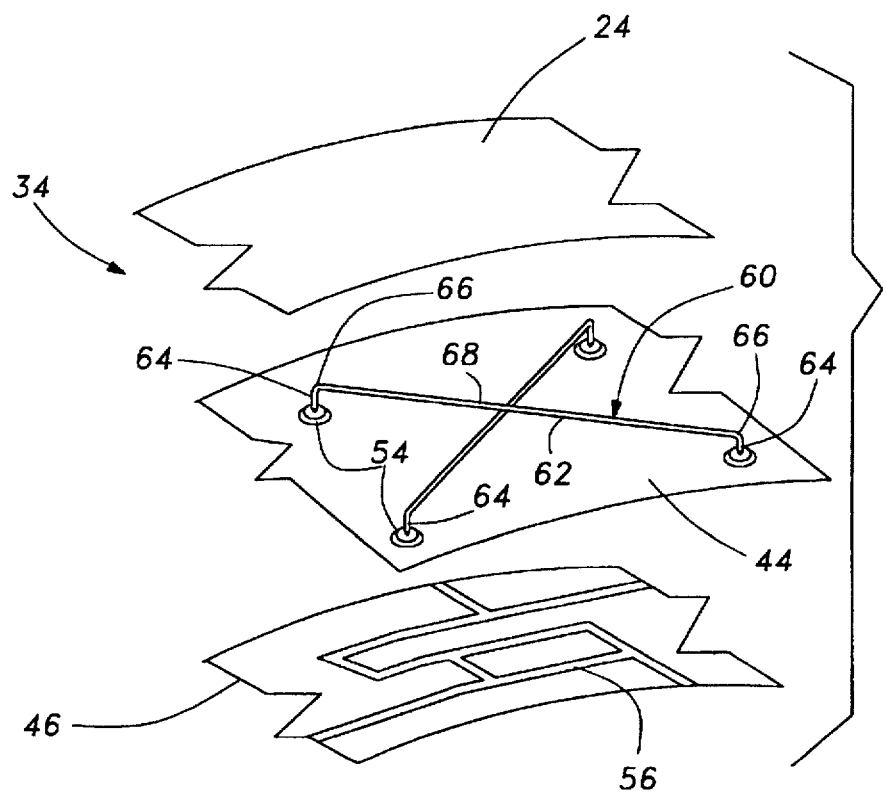
FIG. 6 is an exploded, perspective view of an alternative horn switch according to the present invention.
Figure 7:
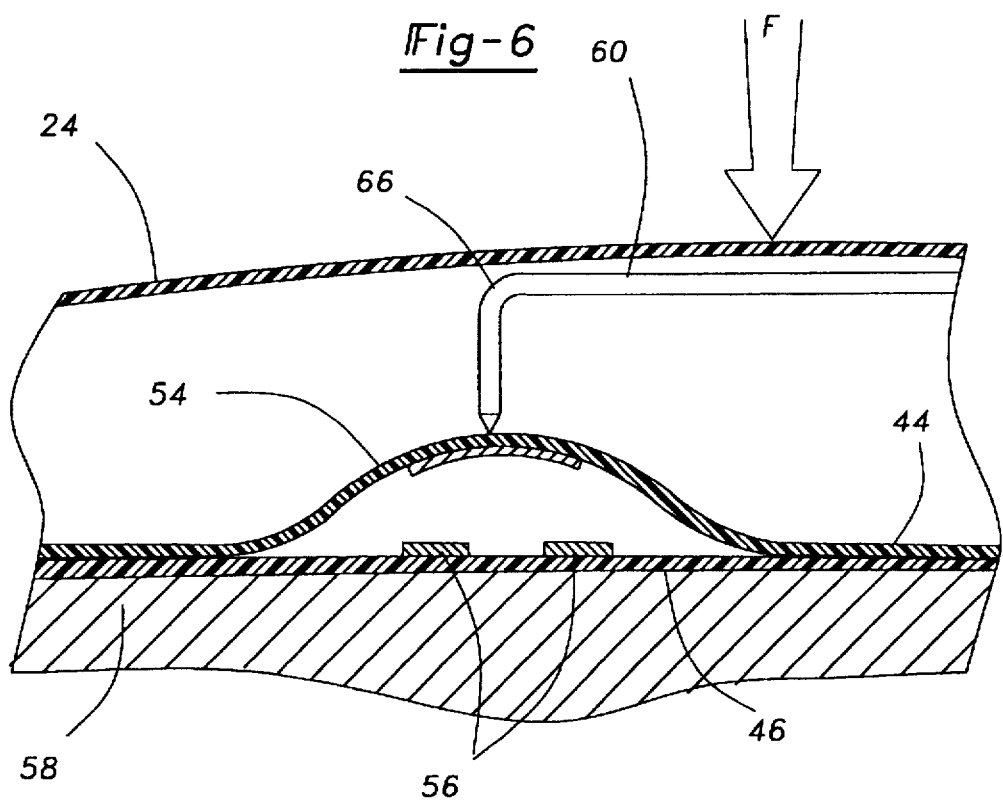
FIG. 7 is a cross-sectional view of the horn switch assembly of FIG. 6.

FIGS. 6 and 7 show an alternative embodiment of the horn portion 34 that includes a relatively rigid element 60 disposed between outer cover 24 and layer 44. Element 60 includes arms 62 each having two fingers 64 extending from ends 66. A finger 64 may also extend from an intersection 68 of arms 62. Rigid element 60 is arranged over layer 44 such that each fingers rest on a bubble 54. Adhesive, or other securing structure, may be used to secure fingers 64 on bubble 54. As with the embodiment disclosed in FIGS. 4 and 5, when a force F is applied to cover 24, at least one arm 62 and fingers 64 push downwardly on bubble 54 to drive conductor 58 toward circuit traces 56. The horn function is thus actuated. Removing force F from cover 24 allows bubble 54 and arms 62 to return to a relaxed position, thereby deactivating the horn function. Again, the operator can push down almost at any central location and still move an arm to activate the horn function.

A preferred description of this invention has been disclosed; however, a worker of ordinary skill in the art would recognize that certain modifications would come within the scope of this invention. For that reason, the following claims should be studied in order to determine the true scope and content of this invention.

I claim:

1. A switch for a vehicle steering wheel comprising:
   a first layer of flexible material having circuit traces disposed on one face which controls a horn function and at least one other function;
   a second layer of flexible material overlaying said first layer and having a plurality of electrically conductive members spaced from circuit traces there being a plurality of said electrically conductive members associated with said horn function;
   wherein depressing said second layer moves at least one of said conductive members into contact with said circuit traces to trigger a function; and
   said second layer including a plurality of bubble members each having an inner face upon which said conductive members are disposed and which are biased away from said first layer.

2. A horn switch as recited in claim 1, further comprising a rigid element disposed above said second layer, said rigid element including arms each having a finger abutting a corresponding bubble, wherein a force may urge at least one finger toward said first layer, thereby urging said second layer toward said first layer and said conductive member into contact with said circuit trace.

3. A horn switch as recited in claim 1, wherein said other function is a cruise control function, and switches for a cruise control function are disposed in an area such that pressing said cruise control switch causes a portion of second layer to move into contact with said first layer and actuate a cruise control function.

4. A vehicle steering wheel assembly comprising:

a steering wheel body;

a flexible outer cover;

a horn switch including a first layer of flexible material having a circuit trace disposed on one face which controls a horn function, and a second layer of flexible material including a plurality of members biased away from said first layer, said members being bubbles molded into said second layer and being provided with a contact on an inner surface of said bubble facing said first layer, such that said bubbles and said circuit traces have differing structure and a plurality of electrically conductive members on an inner face of said members spaced from said circuit trace and said plurality of electrically conductive member being movable toward said circuit trace to complete an electrical circuit and actuate said horn function; and said cover overlaying said horn switch, wherein depressing said cover moves at least one of said conductive members into contact with said circuit trace to trigger a horn.

5. A steering wheel assembly as recited in claim 4, further comprising a rigid element disposed between said outer cover and said second layer, said rigid element including arms each having a finger abutting a corresponding bubble, wherein applying a force on said outer cover urges at least one finger toward said first layer, thereby urging said second layer toward said first layer and said conductive member into contact with said circuit trace.

6. A steering wheel assembly as recited in claim 4, wherein said first layer includes circuit traces to actuate a cruise control function, and bubbles are provided in said second layer to provide selective actuation of said cruise control function.

7. A steering wheel assembly comprising:

a steering wheel body;

an airbag assembly secured to steering wheel body;

an outer cover overlaying said steering wheel body and said airbag assembly;

a flexible switch disposed between said airbag assembly and said outer cover including a first layer of flexible material having circuit traces disposed on one face which controls a horn function and a cruise control function, and a second layer of flexible material overlaying said first layer and having a plurality of electrically conductive members spaced from said circuit trace there being a plurality of said electrically conductive members movable toward said circuit trace to actuate said horn function, and said horn function and said cruise control function being separately actuatable by moving associated ones of said plurality of electrically conductive members into associated ones of said circuit traces;

at least one cruise control switch; and wherein depressing a central portion of said cover urges at least one of said conductive members into contact with a first group of said circuit traces to trigger a horn, and said one cruise control switch can be depressed to bring one of said conductive members into contact with a second group of said circuit traces to control a cruise control function.

8. A steering wheel assembly as recited in claim 7, wherein said second layer includes a plurality of bubbles each having an inner face upon which said conductive members are disposed.

9. A switch has recited in claim 1, wherein said first and second layers have tear strips formed therein.

10. A vehicle steering wheel assembly as recited in claim 4, wherein said first and second layer of said flexible material having tear strips formed therein.

11. A steering wheel assembly as recited in claim 7, wherein said first and second layer having tear strips formed therein.

* * * * *